US006837621B1

(12) United States Patent
Sakamoto

(10) Patent No.: US 6,837,621 B1
(45) Date of Patent: Jan. 4, 2005

(54) ROTOR BEARING FOR INCREASED LUBRICANT FLOW

(75) Inventor: Stephen M. Sakamoto, Oklahoma City, OK (US)

(73) Assignee: Wood Group ESP, Inc., Oklahoma City, OK (US)

( * ) Notice: Subject to any disclaimer, the term of this patent is extended or adjusted under 35 U.S.C. 154(b) by 87 days.

(21) Appl. No.: 10/353,547

(22) Filed: Jan. 29, 2003

(51) Int. Cl.[7] .................................. F16C 3/00
(52) U.S. Cl. ....................................... 384/97
(58) Field of Search ................ 384/100, 114, 384/241, 415, 97, 280, 397; 310/87, 90

(56) References Cited

U.S. PATENT DOCUMENTS

| | | | |
|---|---|---|---|
| 3,671,786 A | * | 6/1972 | Jones .......................... 310/87 |
| 4,453,099 A | | 6/1984 | Flat |
| 4,513,215 A | | 4/1985 | Del Serra |
| 4,521,708 A | | 6/1985 | Vandevier |
| 5,033,937 A | * | 7/1991 | Wilson ........................ 384/425 |
| 5,128,573 A | | 7/1992 | Liu et al. |
| 5,189,328 A | | 2/1993 | Knox |
| 5,209,577 A | * | 5/1993 | Swatek ........................ 384/97 |
| 5,713,670 A | | 2/1998 | Goldowsky |
| 5,828,149 A | | 10/1998 | Parmeter et al. |
| 6,091,175 A | | 7/2000 | Kinsinger |
| 6,099,271 A | | 8/2000 | Brookbank |
| 6,109,790 A | | 8/2000 | von Gynz-Rekowski et al. |
| 6,225,720 B1 | | 5/2001 | Desta |
| 6,250,806 B1 | | 6/2001 | Beshoory |
| 2002/0125777 A1 | * | 9/2002 | Parmeter et al. .............. 310/90 |

* cited by examiner

Primary Examiner—Thomas R. Hannon
(74) Attorney, Agent, or Firm—Crowe & Dunlevy, P.C.

(57) ABSTRACT

Disclosed is an improved hydrodynamic bearing assembly for use in a motor assembly. The motor assembly typically includes a shaft with an axially oriented fluid channel and at least one radial shaft port extending through the wall of the shaft. The bearing assembly includes a bearing sleeve and a bearing collar. Preferably, the radial thickness of the bearing sleeve is at least the radial thickness of the bearing collar. It is also preferred that the bearing sleeve includes at least one bearing port that can be aligned with the shaft port to provide a path of fluid travel from inside the axially oriented fluid channel through the bearing sleeve.

15 Claims, 5 Drawing Sheets

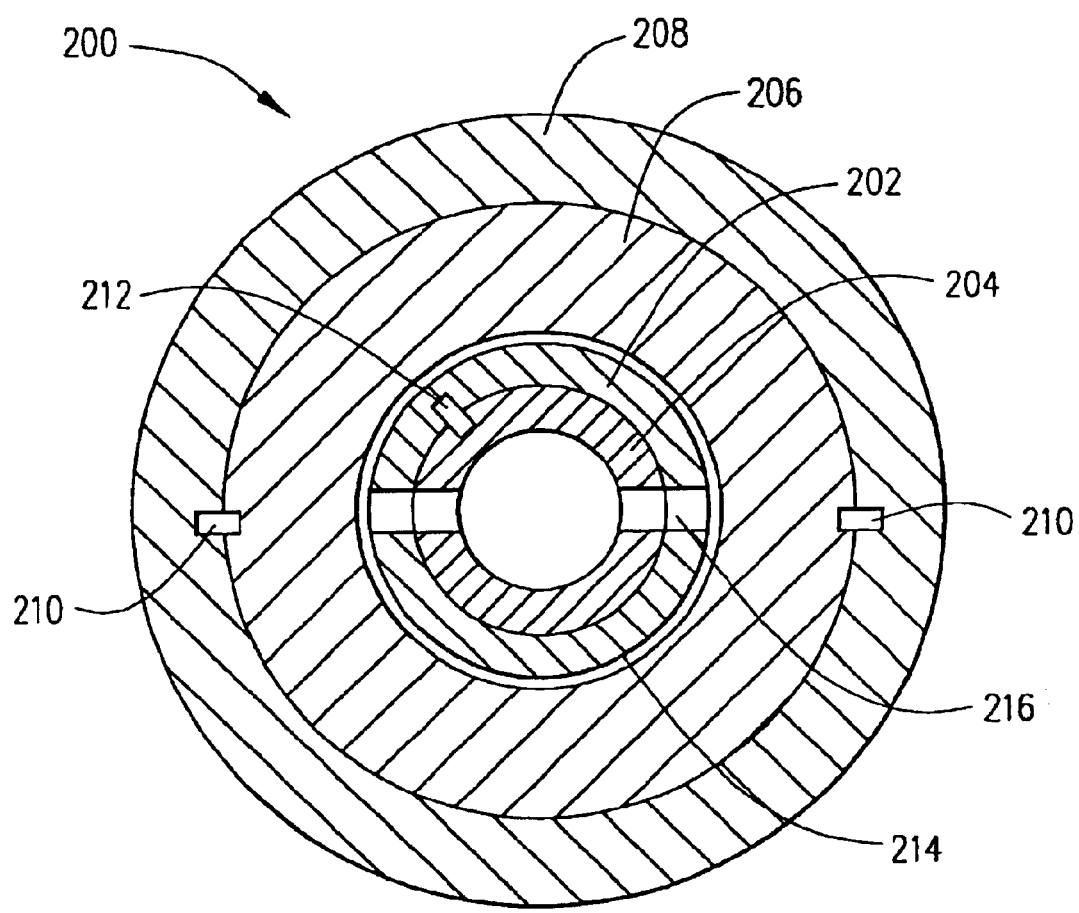
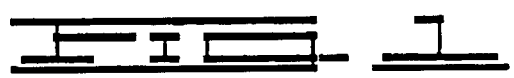
PRIOR ART

ROTOR BEARING FOR INCREASED LUBRICANT FLOW

FIELD OF THE INVENTION

This invention relates generally to the field of rotor bearings for motors, and more particularly, but not by way of limitation, to a motor bearing assembly for an electric motor.

BACKGROUND

Submersible pumping systems are often deployed into wells to recover petroleum fluids from subterranean reservoirs. Typically, the submersible pumping system includes a number of components, including one or more electric motors coupled to one or more high performance centrifugal pumps. Each of the components in a submersible pumping system must be engineered to withstand the inhospitable downhole environment.

Like conventional motors, submersible motors typically operate by using a "stator" to create a series of moving electromagnetic fields that cause a ferromagnetic "rotor" to spin about a fixed axis. In submersible motors, the stators usually surround the rotors, which are secured to a center shaft that is used to transfer the output of the motor. In this way, the rotor and shaft spin about a common axis inside the motionless stator.

Submersible motors can vary in length from a few feet to nearly one hundred feet and may be rated up to hundreds of horsepower. In longer submersible motors, it may be desirable to employ a number of separate rotor sections within a single stator. Each rotor section is usually constructed from a number of thin pieces of material, or laminations, that are held in place by electrically conductive rods inserted through openings in the laminations. The shaft can be secured within the inner diameter of the rotor sections with a keyed connection or by one of several other well-known methods.

Bearing assemblies are typically placed between adjacent rotor sections to center the rotor and shaft within the stator. Most rotor bearing assemblies include a bearing sleeve that rotates in close proximity with a surrounding bearing collar. The bearing sleeve is typically fixed to the motor's shaft and the bearing collar is fixed in a stationary condition to the stator. In most submersible motors, the rotor bearing assemblies are "hydrodynamic," and rely on the presence of a thin film of lubricant in the annulus between the bearing sleeve and bearing collar.

In some prior art designs, lubricant is pumped into the annulus between the bearing sleeve and bearing collar by the centrifugal force generated by the spinning shaft and bearing sleeve and shaft. Lubricant is supplied to the bearing sleeve through a hollow channel in the motor shaft that is connected to a lubricant reservoir. Linearly aligned ports in the shaft and bearing sleeve deliver the lubricant from the hollow channel in the shaft to the annulus between the bearing sleeve and collar. The lubricant then flows into the spaces between the rotor sections and the stator, thereby protecting these components.

By way of illustration, FIG. 1 shows a prior art rotor bearing assembly 200 includes a rotor bearing sleeve 202 that is secured to a hollow shaft 204 and a rotor bearing collar 206 that is attached to the stator 208. The rotor bearing sleeve 202 may be secured to the shaft 204 and the bearing collar 206 to the stator 208 by any of a number of well known methods, such as keyed connections 210 and 212. An oil-filled annulus 214 occupies the space between the bearing sleeve 202 and bearing collar 206. As the bearing sleeve 202 and shaft 204 rotate, lubricant is drawn out of the shaft 204 and pushed into the annulus 214 through a port 216. In this way, the bearing sleeve 202 propels lubricant from the shaft 204 into the annulus 214 through the port 216.

As motors continue to increase in speed and power, the need for effective lubrication also increases. Although effective to a limited degree, prior art rotor bearings fail to circulate sufficient quantities of lubricant to satisfy the demands of next generation motors. Without sufficient lubrication, the moving components of the submersible motor can become worn and result in mechanical or electrical failure. Failure of the components in the motor can result in expensive repairs and work stoppages. Cost savings can be realized with motors that last longer and incur minimal downtime.

There is therefore a continued need for improving the lubrication of submersible motors. It is to these and other deficiencies in the prior art that the present invention is directed.

SUMMARY OF THE INVENTION

Preferred embodiments of the present invention provide an improved hydrodynamic bearing assembly for use in a motor assembly. The motor assembly typically includes a shaft with an axially oriented fluid channel and at least one radial shaft port extending through the wall of the shaft. The bearing assembly includes a bearing sleeve and a bearing collar. Preferably, the radial thickness of the bearing sleeve is at least the radial thickness of the bearing collar. It is also preferred that the bearing sleeve includes at least one bearing port that can be aligned with the shaft port to provide a path of fluid travel from inside the axially oriented fluid channel through the bearing sleeve.

BRIEF DESCRIPTION OF THE DRAWINGS

FIG. 1 is a top cross-sectional view of a Prior Art bearing assembly and motor shaft.

FIG. 6 is a perspective view of the rotor bearing sleeve of FIG. 3.

DETAILED DESCRIPTION OF THE PREFERRED EMBODIMENT

Figure 2:
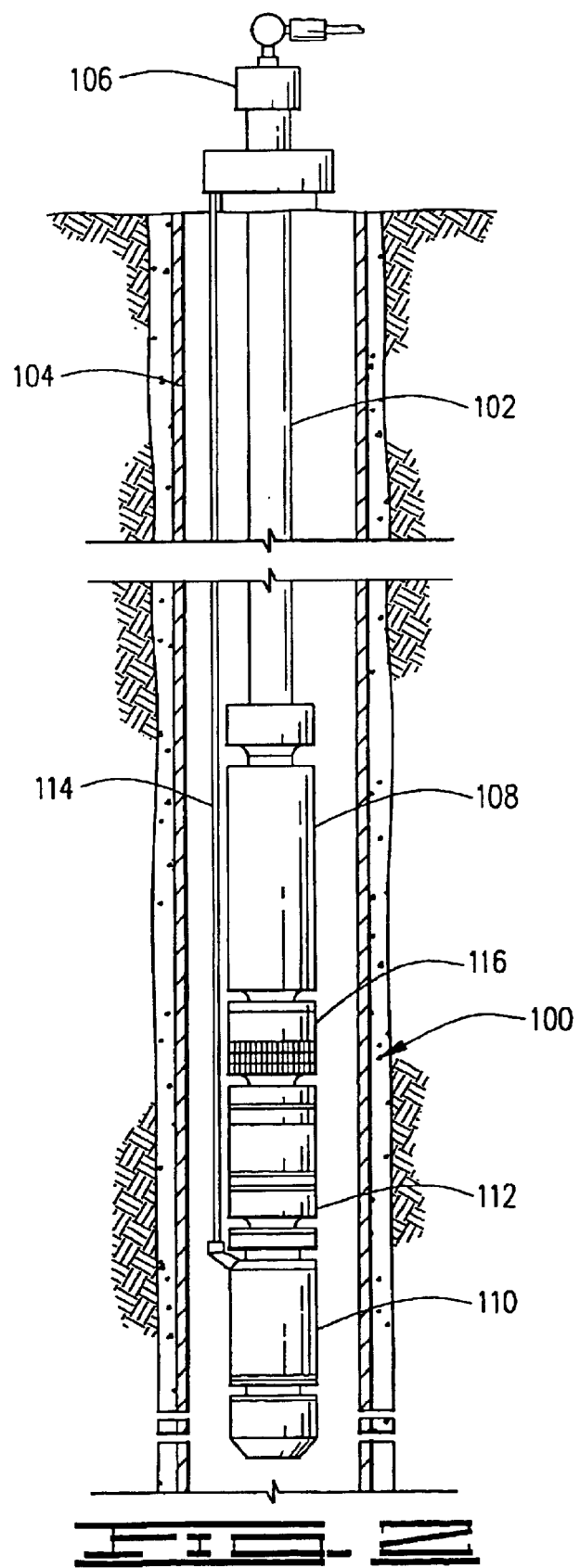
FIG. 2 is an elevational view of an electric submersible pumping system disposed in a wellbore constructed in accordance with a preferred embodiment of the present invention.

In accordance with a preferred embodiment of the present invention, FIG. 2 shows an elevational view of a pumping system 100 attached to production tubing 102. The pumping system 100 and production tubing are disposed in a wellbore 104, which is drilled for the production of a fluid such as water or petroleum. As used herein, the term "petroleum" refers broadly to all mineral hydrocarbons, such as crude oil, gas and combinations of oil and gas. The production tubing 102 connects the pumping system 100 to a wellhead 106 located on the surface.

The pumping system 100 preferably includes some combination of a pump assembly 108, a motor assembly 110 and a seal section 112. The seal section 112 shields the motor assembly 110 from axial thrust loading produced by the pump assembly 108 and ingress of fluids produced by the well. The motor assembly 110 is provided with power from the surface by a power cable 114.

Although only one pump assembly 108 and only one motor assembly are shown, it will be understood that more than one of each can be connected when appropriate. The pump assembly 108 is preferably fitted with an intake section 116 to allow well fluids from the wellbore 104 to enter the pump assembly 108. The intake section 116 has holes to allow the well fluid to enter the pump assembly 108, where the well fluid is forced to the surface through the production tubing 102.

Figure 3:
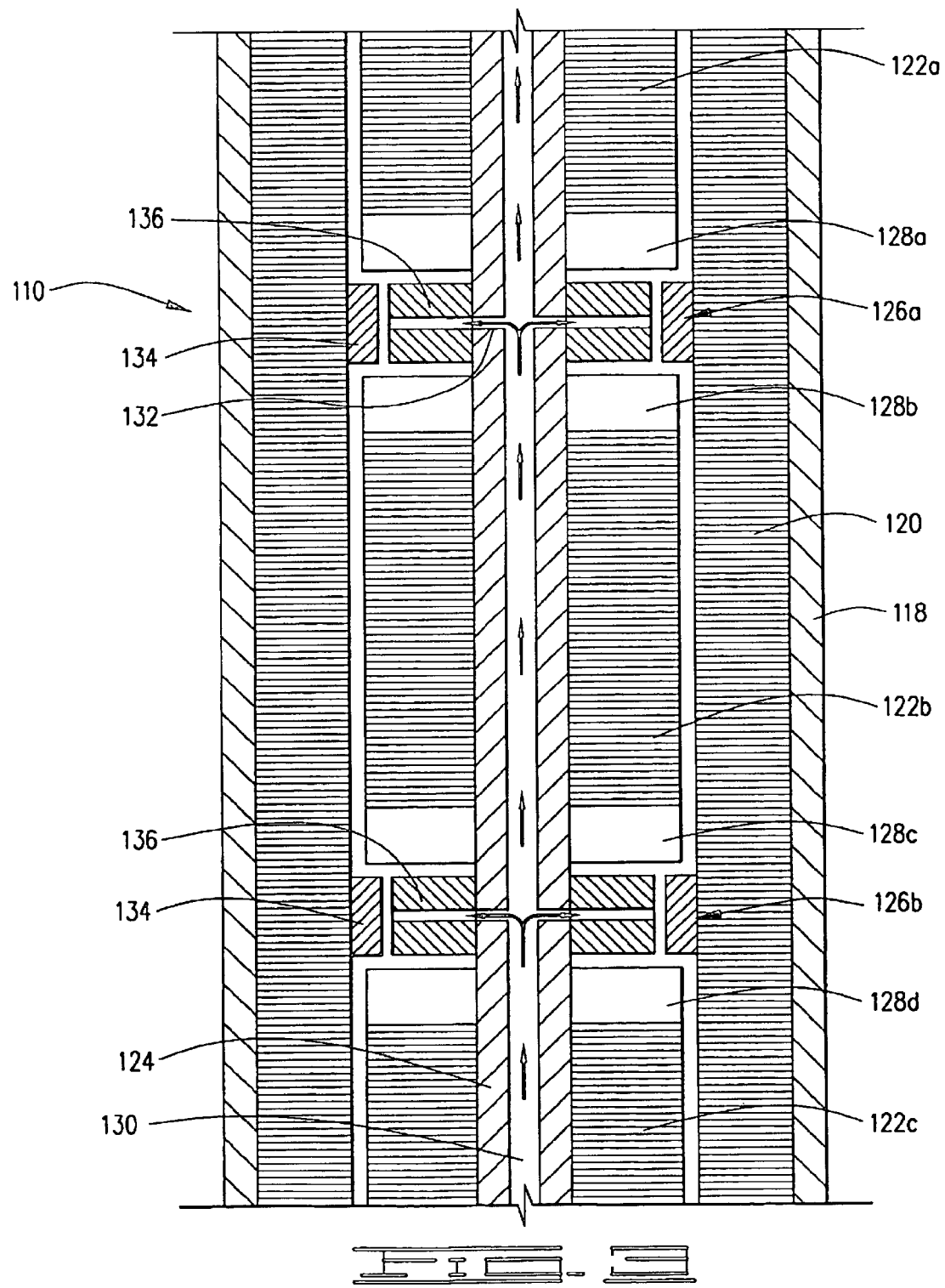
FIG. 3 is an elevational partial cross-sectional view of a portion of the motor assembly of the submersible pump of FIG. 2.

Referring now to FIG. 3, shown therein is an elevational partial cross-sectional view of a portion of the motor assembly 110. The motor assembly 110 generally includes a motor housing 118, a stator assembly 120, one or more rotor assemblies 122, a shaft 124 and one or more bearing assemblies 126. The structure and interrelated function of each of these components is discussed below.

The motor housing 118 is preferably cylindrical and fabricated from a durable, anti-corrosive material. The motor housing 118 encompasses and protects the internal portions of the motor assembly 110 and preferably eliminates the entry of well fluids into the motor assembly 110. In certain applications, it is preferred that the motor housing 118 be fitted with flanges or other adapters for connection to adjacent downhole components.

Adjacent the motor housing 118 is a stationary stator assembly 120 that remains fixed in position adjacent the motor housing 118. The stator assembly 120 is preferably constructed from a plurality of circular laminations (not separately designated) that are aligned and stacked under compression. Windings (not shown) between the laminations are used to conduct electricity through the stator assembly 120. As is known in the art, electricity flowing through the stator assembly 120 according to predefined commutation states creates a rotating magnetic field.

Although three rotor assemblies 122 (individually designated as 122a, 122b and 122c) are shown in FIG. 3, it will be understood that the number and configuration of rotor assemblies 122 can vary depending on the particular requirements of the motor assembly 110. For example, several differently sized rotor assemblies 122 can be used within a single motor assembly 110. Like the stator assembly 120, the rotor assemblies 122 preferably include a plurality of laminations (not separately designated) that are aligned and stacked.

Each rotor assembly 122 also includes conductive rotor bars (not shown) that extend axially from opposing end rings 128 (individually designated as 128a, 128b, 128c and 128d). The conductive rotor bars are preferably constructed and configured to cause the rotor assembly 122 to rotate in response to the moving magnetic fields produced by the stator assembly 120. The end rings 128 are used to retain the rotor bars, compress the laminations and support the weight of the rotor assembly 120 on a thrust washer or support ring (not shown), and to conduct current flowing in the rotor assembly 122.

The shaft 124 extends substantially the length of the motor assembly 110 and transfers the motion generated by the motor assembly 110 to the pump assembly 108. The shaft 124 includes an axially oriented lubricant channel 130 that is connected to a motor lubricant reservoir (not shown) at the bottom of the motor assembly 110. The lubricant channel 130 is configured to permit the flow of motor lubricant from the lubricant reservoir through the shaft 124. The shaft 124 also includes one or more shaft ports 132 that extend radially from the lubricant channel 130 to the outer diameter of the shaft 124.

Also shown in FIG. 3 are two bearing assemblies 126 (individually designated as 126a and 126b). The bearing assemblies 126 each include a bearing collar 134 and a bearing sleeve 136. The bearing collars 134 are secured to the stator assembly 120 by a keyed connection (not shown) or any of several other methods known in the art. Likewise, the bearing sleeves 136 are secured to shaft 124 using any of several methods known in the art such as a keyed connection or shrink fitting.

Figure 4:
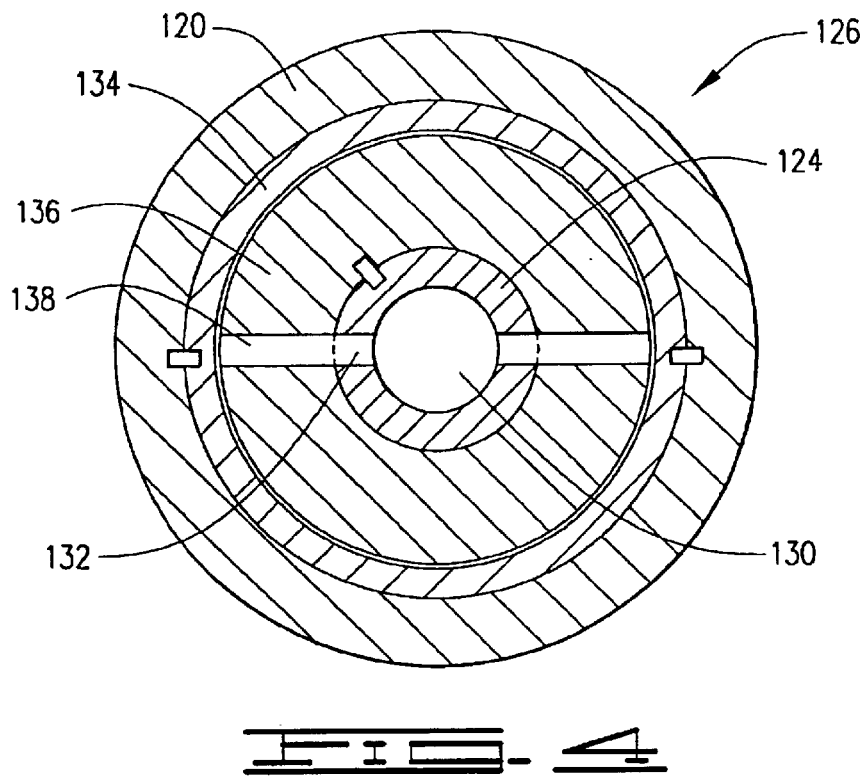
FIG. 4 is a top plan view of a first preferred embodiment of the rotor bearing sleeve of the bearing assembly of the motor assembly of FIG. 2.

Now also referring to FIG. 4, shown therein is a top plan view of a first preferred embodiment of the bearing sleeve 136. The bearing sleeves 136 are constructed with one or more bearing ports 138. The bearing ports 138 are linearly aligned with the shaft ports 132 to provide a conduit for the flow of lubricant from the lubricant channel 130 to the outer diameter of the bearing sleeve 136. Although each bearing sleeve 136 is shown with two bearing ports 138 that mate with two shaft ports 132, the present invention is not so limited. Greater or fewer numbers of bearing ports 138 may be desirable and are encompassed within the scope of the present invention. To minimize vibration during rotation, it is typically desirable to evenly space the bearing ports 138 and shaft ports 132 about the bearing sleeve 136 and shaft 124, respectively.

Unlike prior art bearing sleeves, the inventive bearing sleeve 136 is significantly larger relative to the bearing collar 134. A primary cause of the deficient pumping ability in prior art bearings is the short length of the ports (such as 216 in FIG. 1) in the bearing sleeve 136. In the past, it has been desirable to use thin bearing sleeves to minimize the rotational speed at the outer diameter of the bearing sleeve and to limit the intertial mass supported by the shaft. Because the total diameter of the rotor bearing is limited by the diameter of the motor, prior art bearings typically include a large bearing collar (such as 206) and a small bearing sleeve (such as 202). In many prior art bearings, bearing collars are four times thicker than the associated bearing sleeves.

The enlarged bearing sleeve 136 and longer bearing ports 138 provide improved pumping action because the outer diameter of the bearing sleeve 136 rotates at a higher velocity. Additionally, the longer bearing ports 138 impart energy to the lubricant over a greater distance, thereby improving the acceleration of lubricant through the bearing sleeve 136. It is believed that noticeably improved pumping action occurs when the bearing sleeve 136 is at least as thick as the bearing collar 134.

Figure 5:
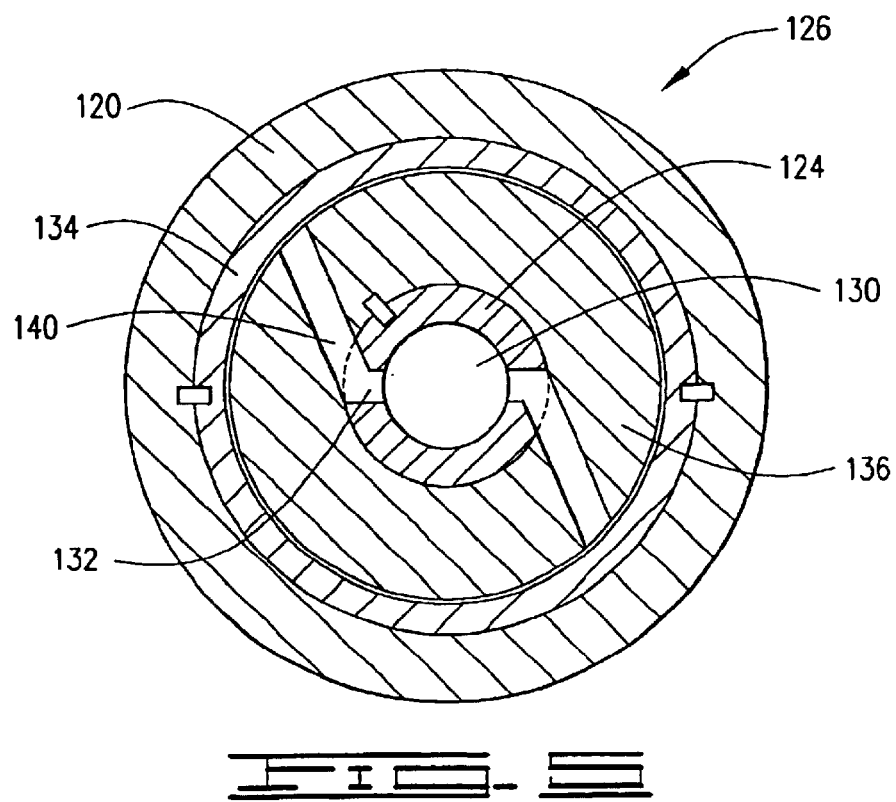
FIG. 5 is a top plan view of a second preferred embodiment of the rotor bearing sleeve of the bearing assembly of the motor assembly of FIG. 2.
Figure 5:
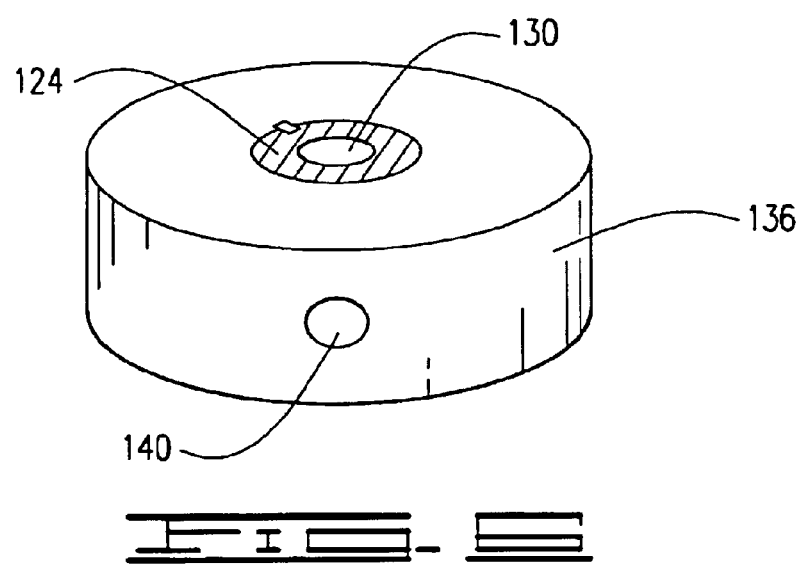

Turning now to FIG. 5, shown therein is a top plan view of a second preferred embodiment of the bearing sleeve 136. In the second preferred embodiment, bearing ports 140 are connected to the shaft ports 132 at angles, which further increases the length of the bearing ports 140. Increasing the length of the bearing ports 140 can improve the lubricant pumping action of the bearing sleeve 136. With the bearing ports 140 at the angle shown in FIG. 5, the bearing assembly 136 is preferably rotated in a counterclockwise direction to optimize the centrifugal pumping action. The relative vertical position of the bearing ports 140 is demonstrated by the perspective view of the bearing sleeve 136 in FIG. 6.

Although the bearing ports 140 shown are straight, it will be understood that curved and multi-angled bearing ports 140 are also encompassed within the scope of the present invention. It may, however, be easier to fabricate bearing sleeves 136 that include straight bearing ports 140. It will also be understood that the bearing ports 140 can be configured at a non-horizontal angle with respect to the shaft 124.

Figure 7:
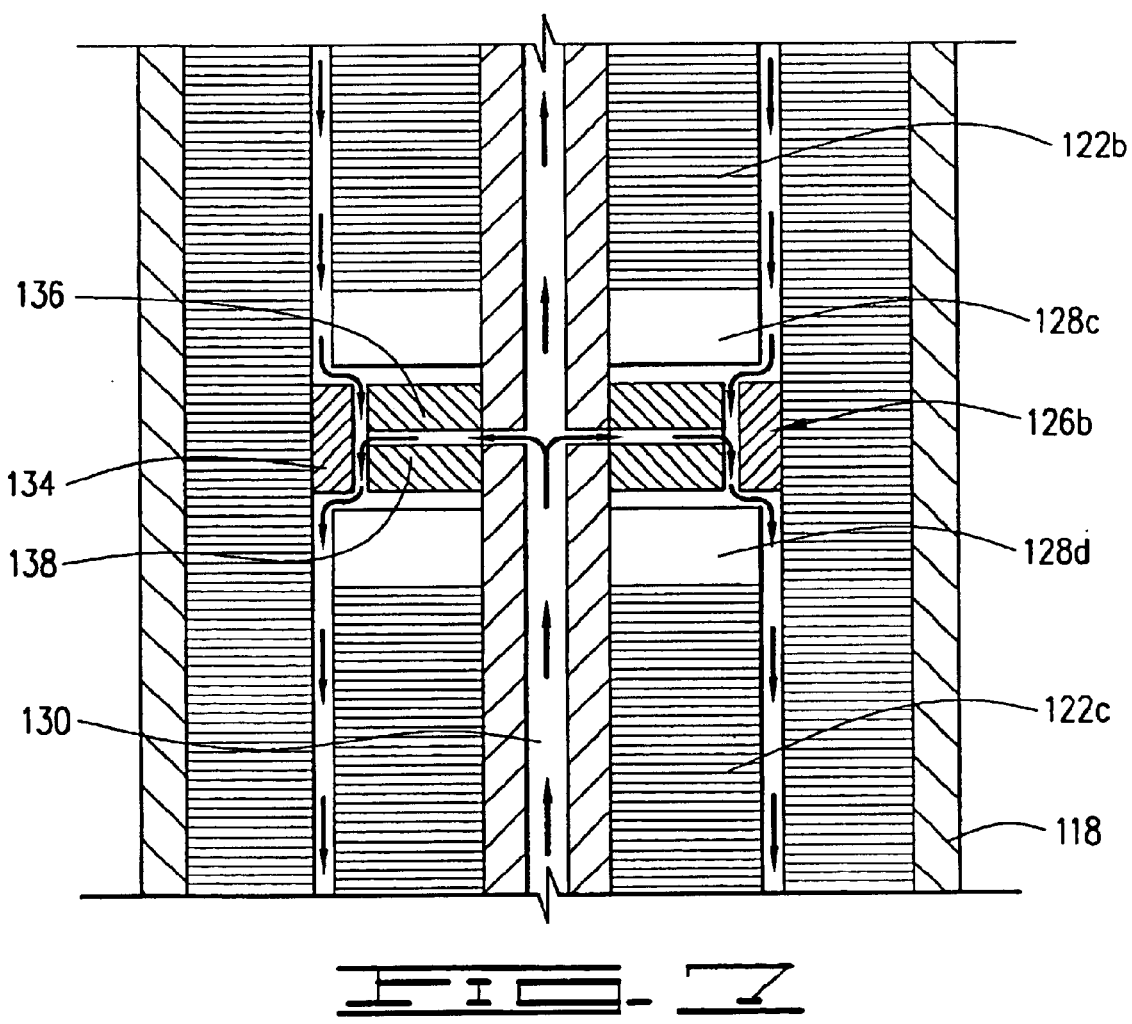
FIG. 7 is an elevational partial cross-sectional view of a portion of the motor assembly of FIG. 2.

FIG. 7 shows an elevational partial cross-sectional view of a portion of a motor assembly 110 constructed in accordance with a preferred embodiment of the present invention. Lubricant flow paths are indicated with arrows to show the migration of the lubricant throughout the motor assembly 110. As the bearing sleeve 136 rotates, lubricant is drawn into the bearing ports 138 out of the lubricant channel 130. The spinning bearing ports 138 impart energy to the lubricant, which is thrown out of the bearing sleeve 136 into the annulus adjacent the bearing collar 134. The lubricant then flows back to the bottom of the motor assembly 110 through the spaces between the stator assembly 120 and the rotor assembly 122. The lubricant is preferably filtered before returning to the hollow lubricant channel 130 for continued circulation.

As the lubricant is pumped out of the bearing sleeve 136, additional lubricant is drawn up the shaft 124 in response to the pressure gradient in the lubricant channel 130. It will be understood that lubricant which does not exit the lubricant channel 130 at bearing ports 138 continues migrating upward and exits the shaft 124 at an upper bearing sleeve or alternative outlet (not shown).

The lubricant flow paths and motor assembly 110 have been set forth above for the purposes of disclosing preferred embodiments of the rotor bearing assembly 126. It will be understood, however, that the rotor bearing assembly 126 can be configured to provide alternate lubricant flow paths within the motor assembly 110. Furthermore, it will also be understood that the bearing assembly 126 can be used in motors that are configured differently than motor assembly 110. For example, although preferred embodiments are disclosed herein with reference to a submersible pumping system 100, it will be understood that the these embodiments also find utility in non-submersible applications, such as surface-based horizontal pumping systems.

In accordance with one aspect of a preferred embodiment, the present invention provides an apparatus for increasing the flow of lubricant in a motor, thereby increasing the motor's operating life. It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention.

What is claimed is:

1. An improved hydrodynamic bearing assembly for use in a motor having a shaft with a lubricant channel and a shaft port, comprising:

a bearing sleeve having a bearing port and having a radial thickness; and a bearing collar having a radial thickness, wherein the radial thickness of the bearing sleeve is at least the radial thickness of the bearing collar.

2. The improved hydrodynamic bearing assembly of claim 1, wherein the bearing port is linearly aligned with the shaft port.

3. The improved hydrodynamic bearing assembly of claim 1, wherein the bearing port connects to the shaft port at an angle.

4. The improved hydrodynamic bearing assembly of claim 1, wherein the bearing port is curved.

5. The improved hydrodynamic bearing assembly of claim 1, wherein the bearing sleeve is configured to move lubricant from the lubricant channel to a space between the bearing sleeve and the bearing collar.

6. The improved hydrodynamic bearing assembly of claim 5, wherein the lubricant is moved from the lubricant channel through the bearing sleeve in response to centrifugal force produced as the bearing sleeve rotates with the shaft.

7. An electric submersible pumping system, comprising:

a pump assembly; and a motor assembly, the motor assembly comprising:

a shaft with a fluid channel and a shaft port;

a bearing sleeve fixed to the shaft, wherein the bearing sleeve has a radial thickness and includes a bearing port; and a bearing collar proximate the bearing sleeve, wherein the bearing collar has a radial thickness;

wherein the radial thickness of the bearing sleeve is at least as large as the radial thickness of the bearing collar.

8. The electric submersible pumping system of claim 7, wherein the bearing port is linearly aligned with the shaft port.

9. The electric submersible pumping system of claim 7, wherein the bearing port connects to the shaft port at an angle.

10. The electric submersible pumping system of claim 7, wherein the bearing port is curved.

11. The electric submersible pumping system of claim 7, wherein the bearing sleeve is configured to move lubricant from the lubricant channel to a space between the bearing sleeve and the bearing collar.

12. The electric submersible pumping system of claim 11, wherein the lubricant is moved from the lubricant channel through the bearing sleeve in response to centrifugal force produced as the bearing sleeve rotates with the shaft.

13. A method for circulating lubricant in a submersible motor assembly having a shaft, a bearing sleeve connected to the shaft and a bearing collar having a radial thickness, wherein the shaft includes an axially oriented lubricant channel and radially oriented shaft ports and wherein the bearing sleeve includes a bearing port that is connected to the shaft port, the method comprising:

rotating the shaft and bearing sleeve to produce a centrifugal force that moves the lubricant from the lubricant channel through the shaft port and bearing port, wherein the distance traveled by the lubricant through the bearing sleeve is greater than the thickness of the bearing collar.

14. The method of claim 13, wherein the lubricant travels along a straight path from the lubricant channel through the bearing sleeve.

15. The method of claim 13, wherein the lubricant travels along a curved path from the lubricant channel through the bearing sleeve.

* * * * *